Figure 7:
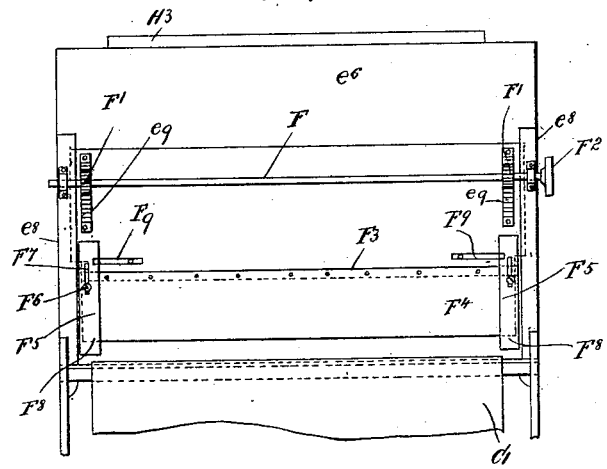

No. 632,535. Patented Sept. 5, 1899.
P. PANOULIAS.
MACHINE FOR DIPPING CHOCOLATE DROPS, &c.
(Application filed Nov. 1, 1898.)
(No Model.) 11 Sheets—Sheet 1.
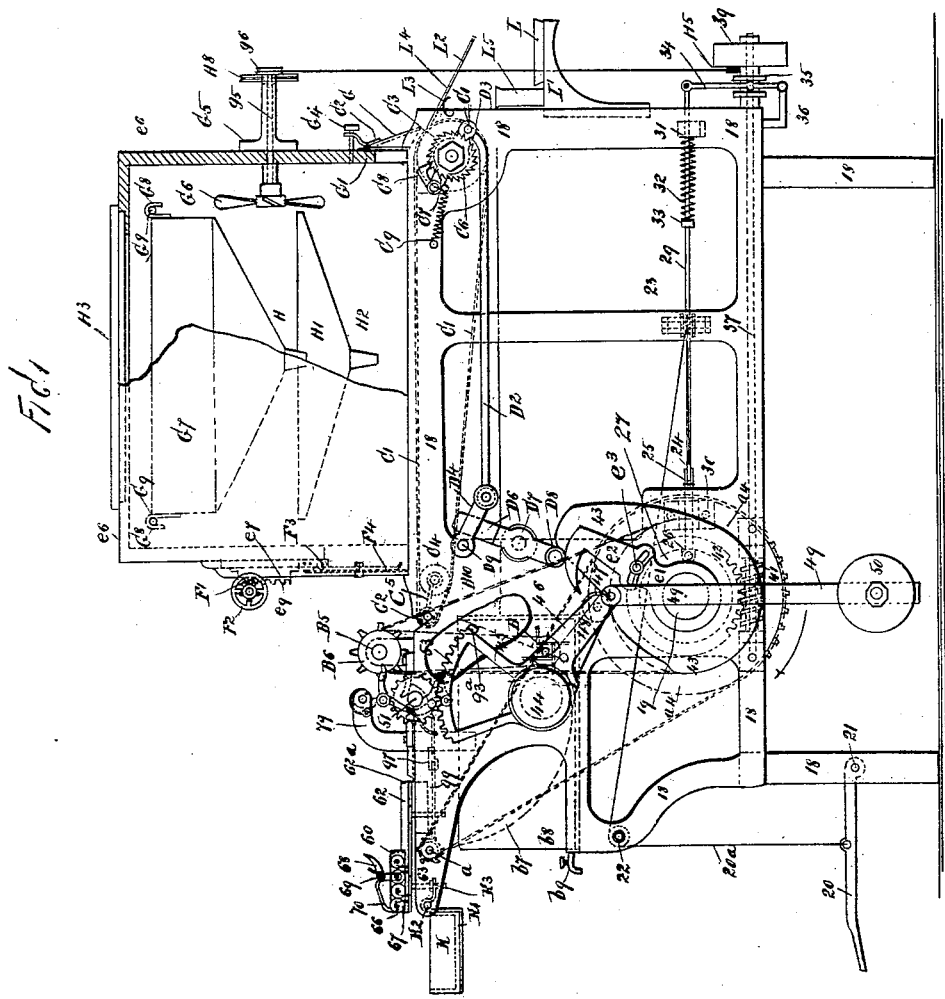
WITNESSES
John Buckler,
F. A. Stewart
INVENTOR
Panayiotis Panoulias
BY
Edgar Tate &Co
ATTORNEYS.

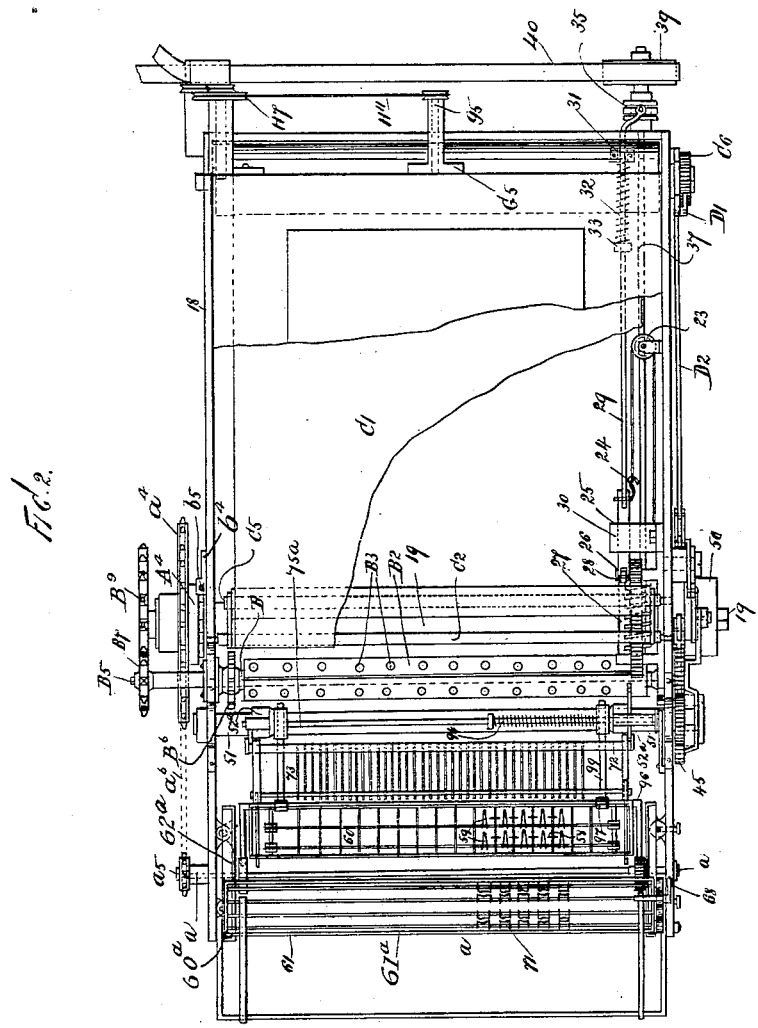

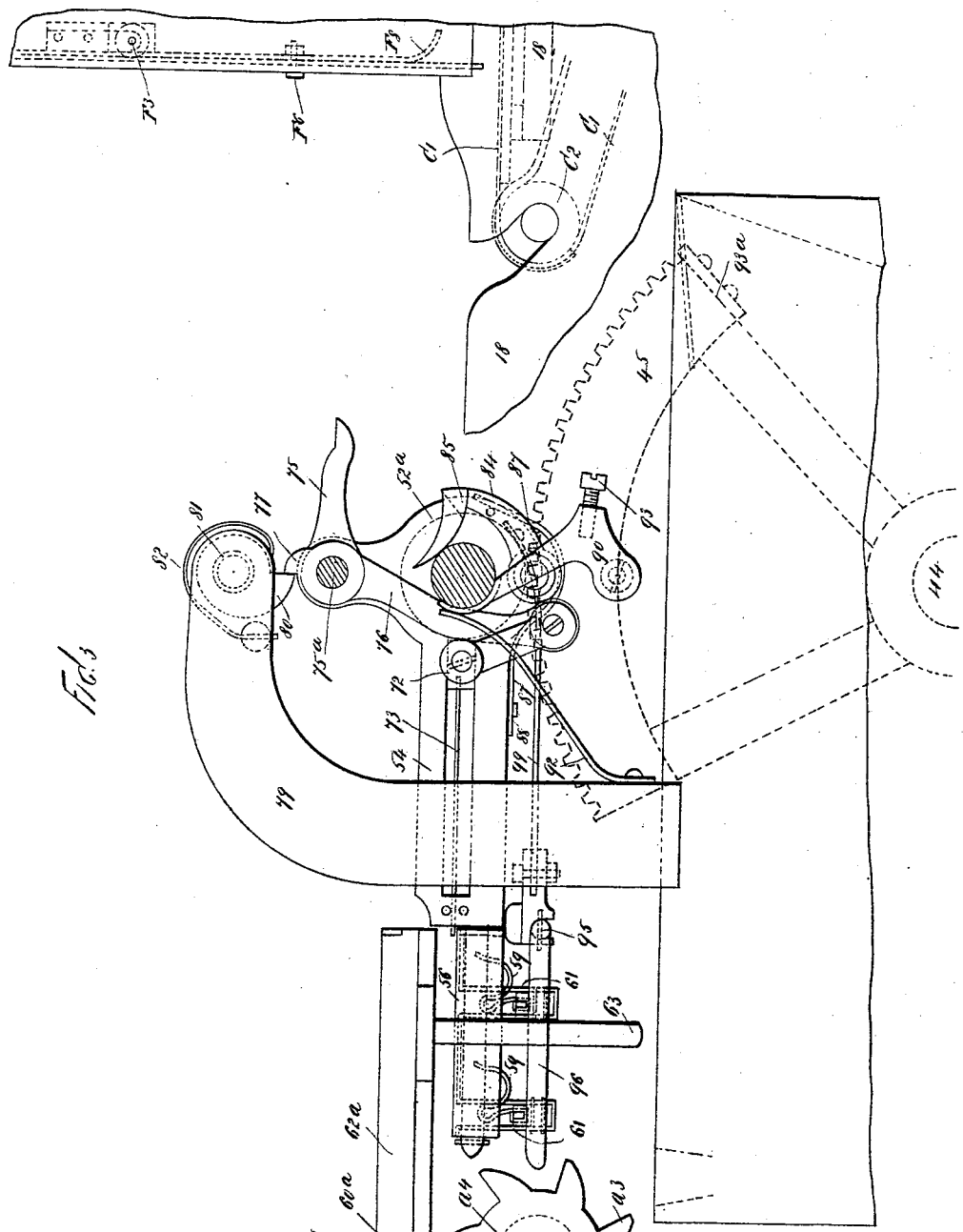

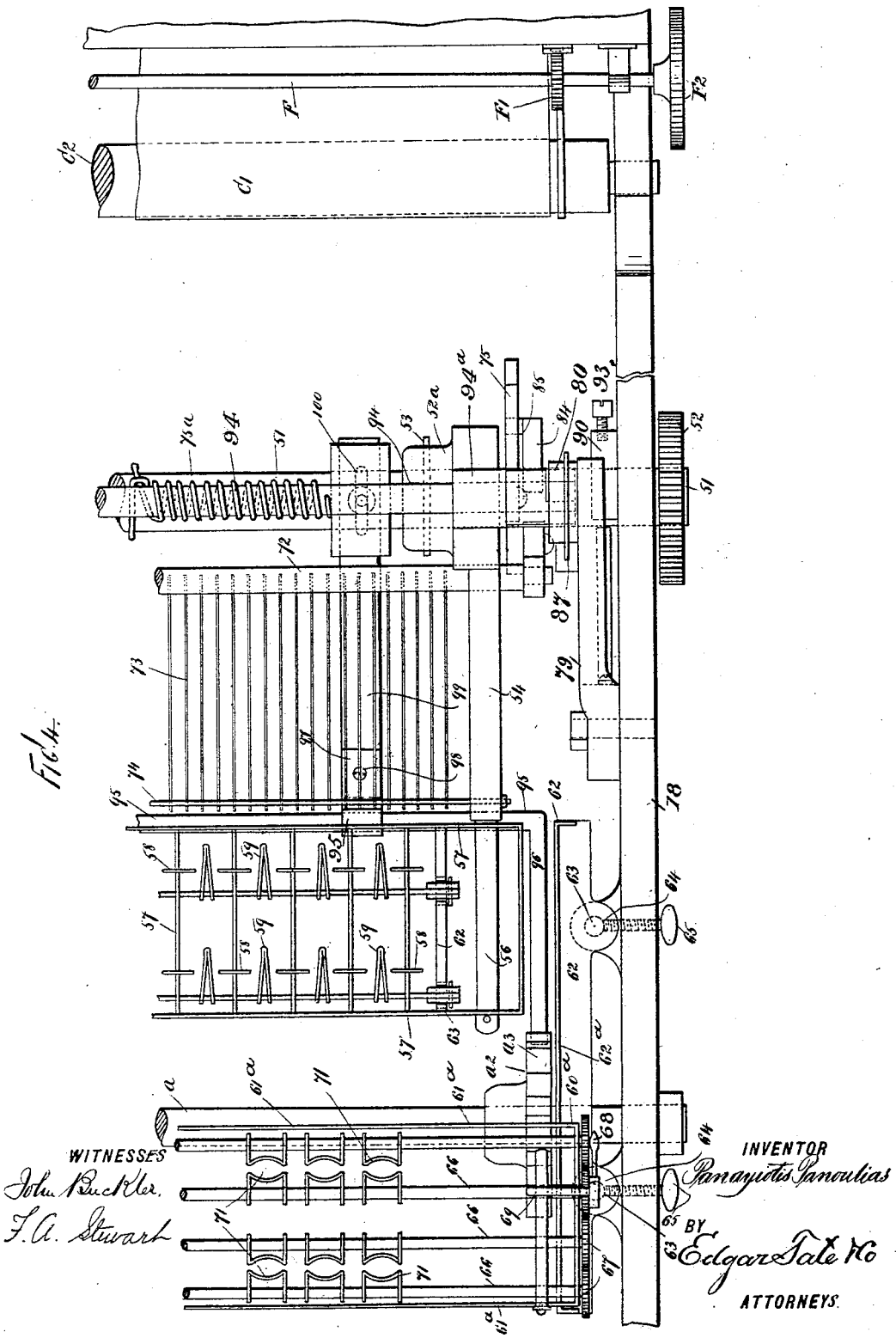

No. 632,535. Patented Sept. 5, 1899.
P. PANOULIAS.
MACHINE FOR DIPPING CHOCOLATE DROPS, &c.
(Application filed Nov. 1, 1898.)
(No Model.) 11 Sheets—Sheet 5.

WITNESS
John Buckler,
F. C. Stewart

INVENTOR
Panayiotis Panoulias
BY
Edgar Tate & Co.
ATTORNEYS.

No. 632,535. Patented Sept. 5, 1899.
P. PANOULIAS.
MACHINE FOR DIPPING CHOCOLATE DROPS, &c.
(Application filed Nov. 1, 1898.)
(No Model.) 11 Sheets—Sheet 6.

WITNESSES
INVENTOR
Panayiotis Panoulias,
BY
Edgar Tate & Co.
ATTORNEYS

No. 632,535. Patented Sept. 5, 1899.
P. PANOULIAS.
MACHINE FOR DIPPING CHOCOLATE DROPS, &c.
(Application filed Nov. 1, 1898.)
(No Model.) 11 Sheets—Sheet 7.
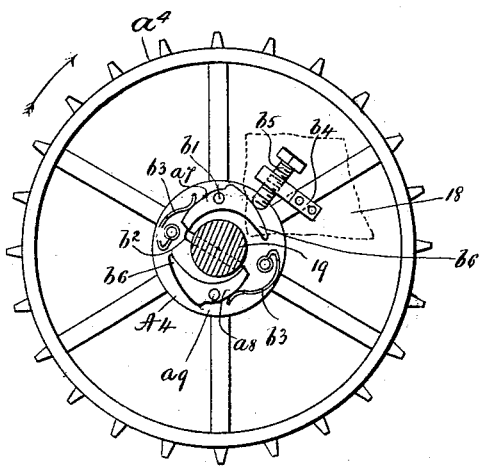
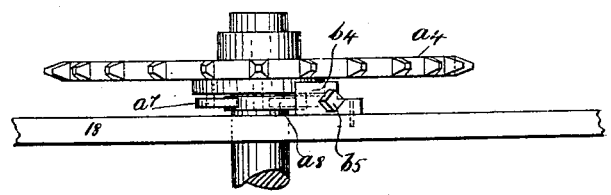
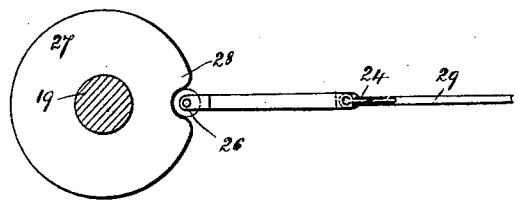
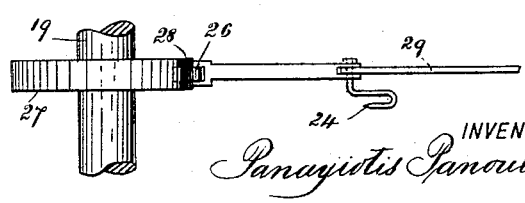
WITNESSES
John Buckler
F. A. Stewart
INVENTOR
Panayiotis Panoulias,
BY
Edgar Tate & Co
ATTORNEYS

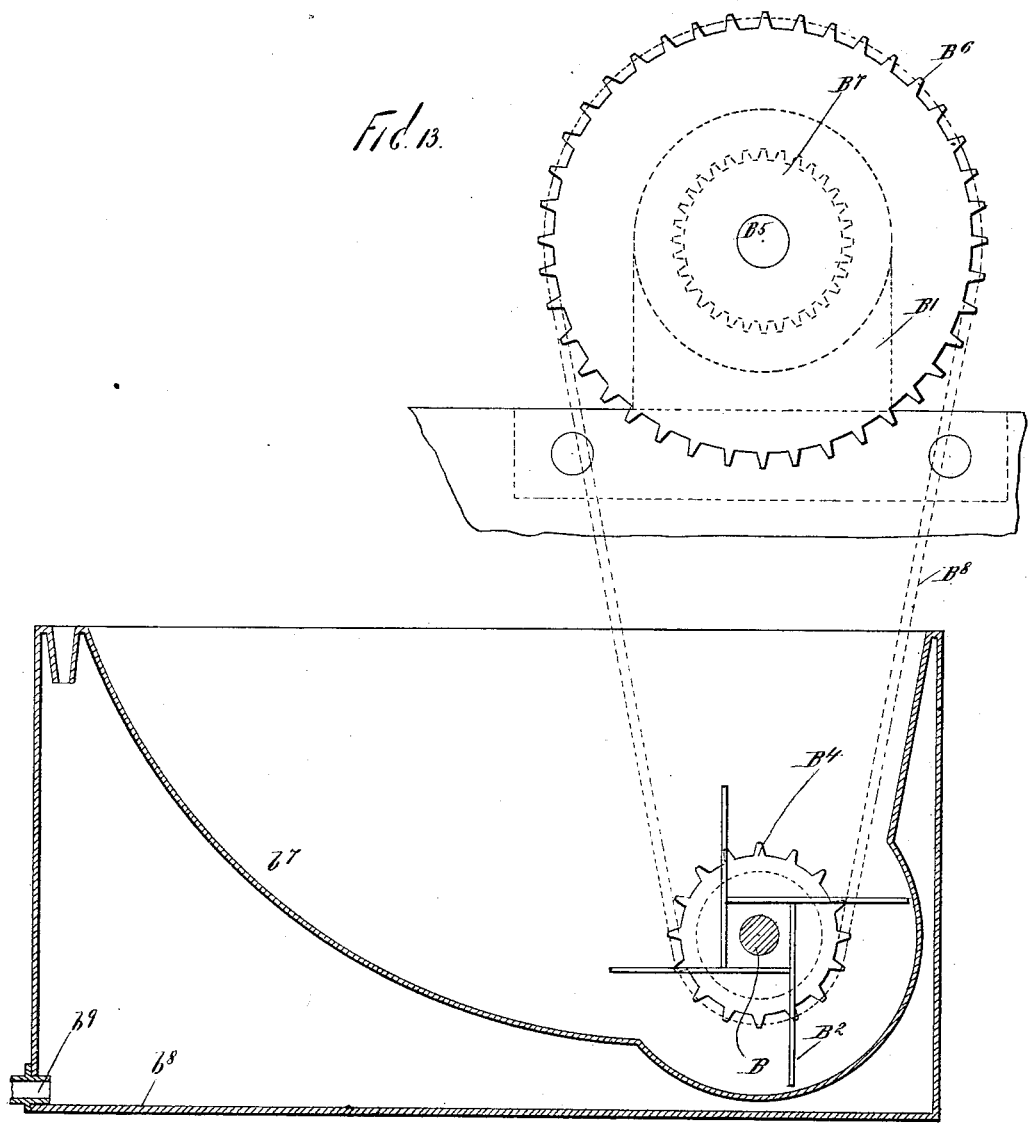

No. 632,535. Patented Sept. 5, 1899.
P. PANOULIAS.
MACHINE FOR DIPPING CHOCOLATE DROPS, &c.
(Application filed Nov. 1, 1898.)
(No Model.) 11 Sheets—Sheet 9.
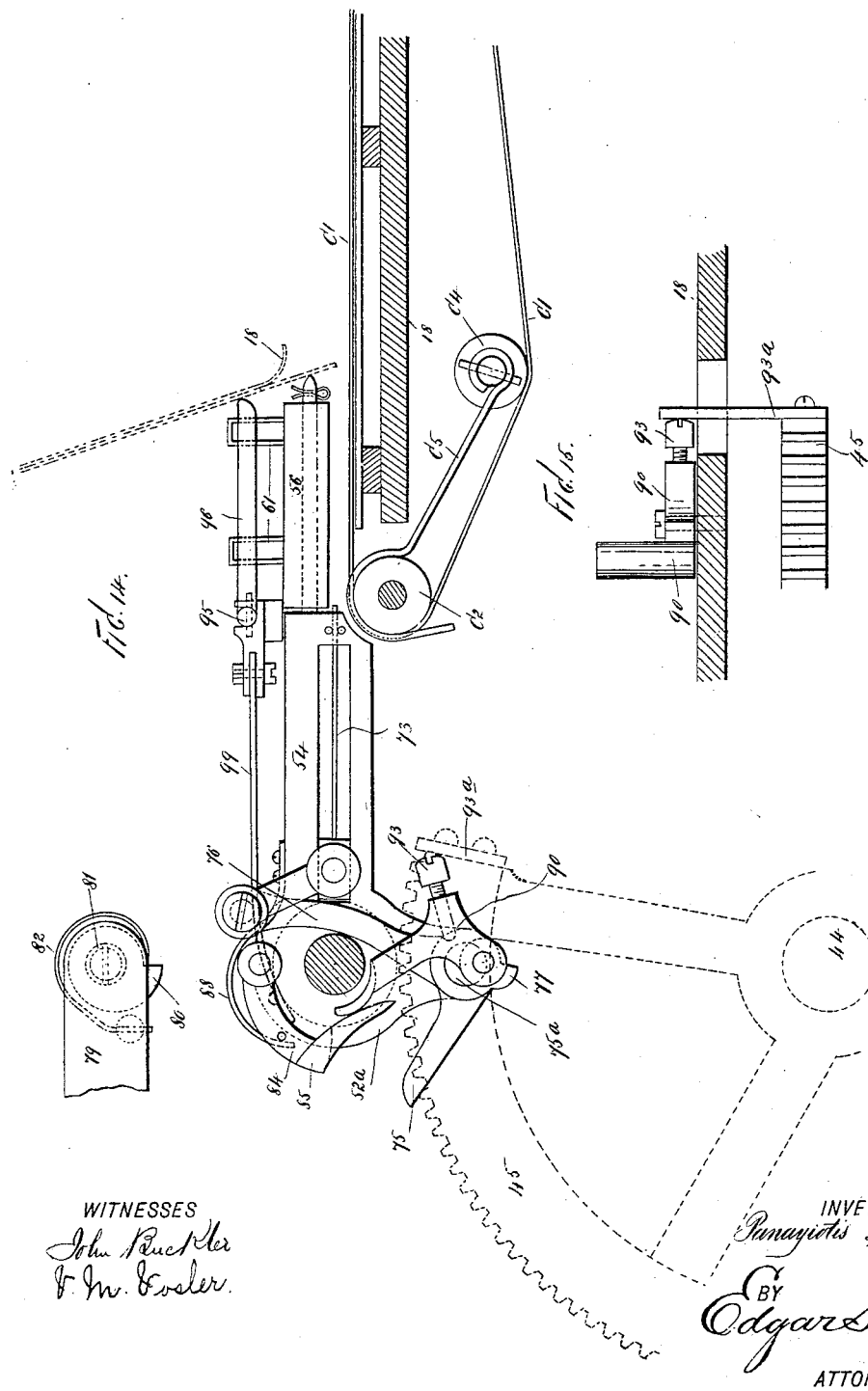
WITNESSES
INVENTOR
Panayiotis Panoulias
BY
Edgar Tate & Co.
ATTORNEYS.

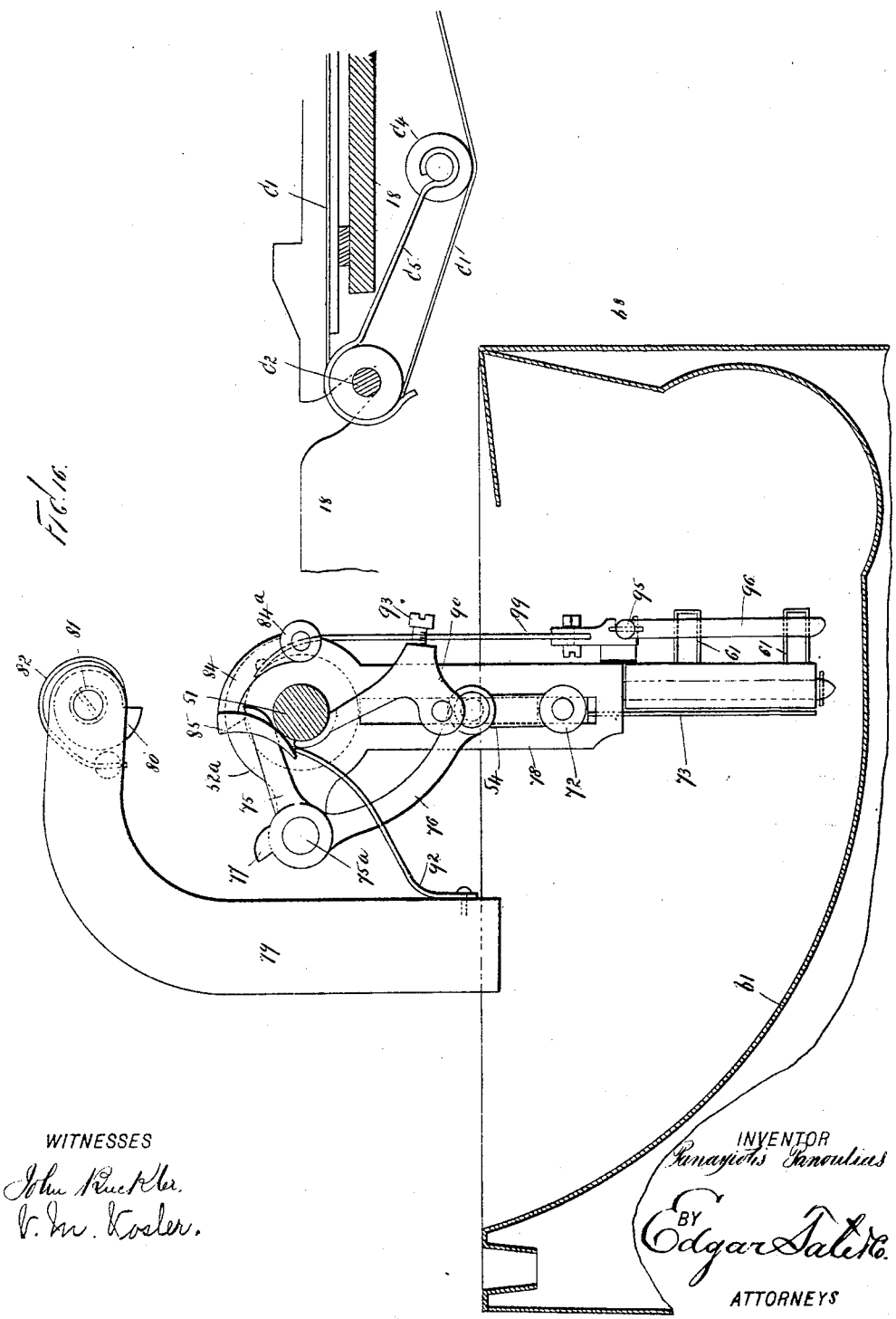

No. 632,535. Patented Sept. 5, 1899.
P. PANOULIAS.
MACHINE FOR DIPPING CHOCOLATE DROPS, &c.
(Application filed Nov. 1, 1898.)
(No Model.) 11 Sheets—Sheet 11.

WITNESSES
John Buckler
K. M. Kosler

INVENTOR
Panayistis Panoulias
BY
Edgar Tate & Co.
ATTORNEYS

THE NORRIS PETERS CO., PHOTO-LITHO., WASHINGTON, D. C.

UNITED STATES PATENT OFFICE.

PANAYIOTIS PANOULIAS, OF NEW YORK, N. Y.

MACHINE FOR DIPPING CHOCOLATE DROPS, &c.

SPECIFICATION forming part of Letters Patent No. 632,535, dated September 5, 1899.

Application filed November 1, 1898. Serial No. 695,161. (No model.)

*To all whom it may concern:*

Be it known that I, PANAYIOTIS PANOULIAS, a subject of the King of Greece, residing at New York, in the county of New York and State of New York, have invented certain new and useful Improvements in Machines for Dipping Chocolate Drops and Analogous Confections, of which the following is a full and complete specification, such as will enable those skilled in the art to which it appertains to make and use the same.

This invention relates to machines for dipping chocolate drops and other confections in the manufacture of which it is desired to coat the cores or bodies of the same with chocolate or other material in a fluid form.

This invention consists in improvements on a machine for which I applied for Letters Patent April 4, 1898, Serial No. 676,442; and the object thereof is to furnish a machine for the purpose above described which shall be superior in point of convenience, positiveness of action and efficiency, and which is fully described in the following specification, of which the accompanying drawings form a part, in which like letters and figures of reference refer to like parts in the several views, and in which—

Figure 6:
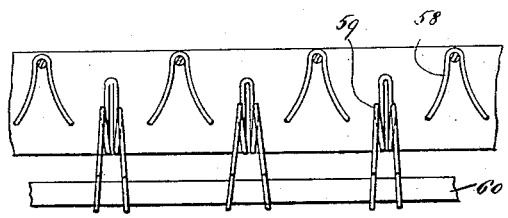
Figure 5:
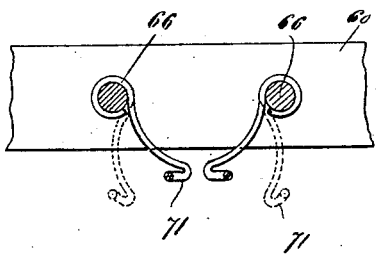
Figure 8:
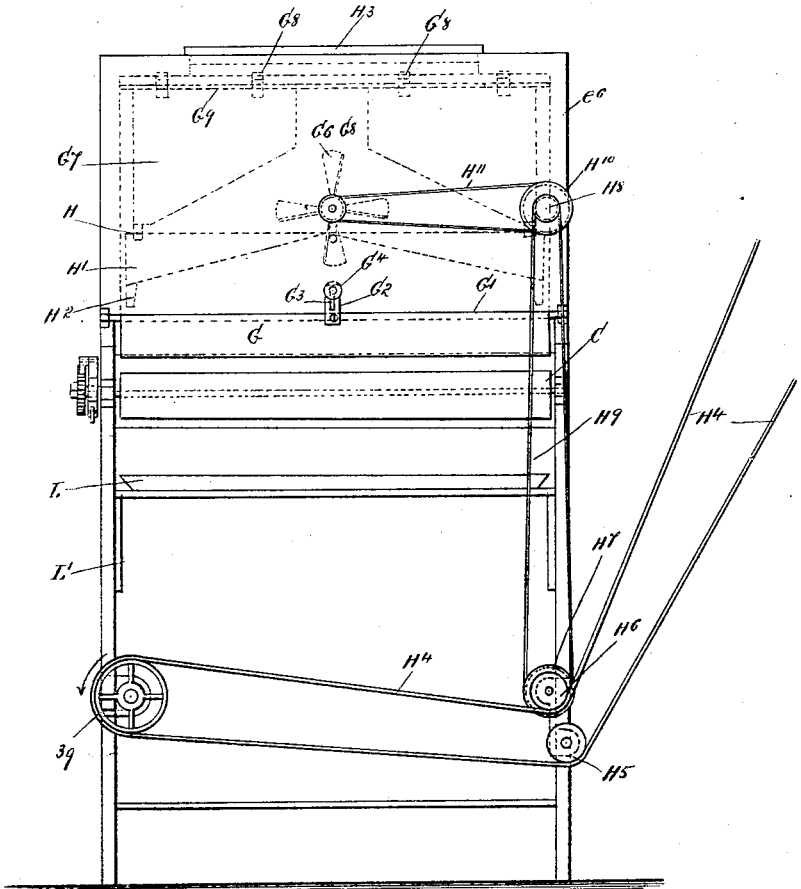
Figure 17:
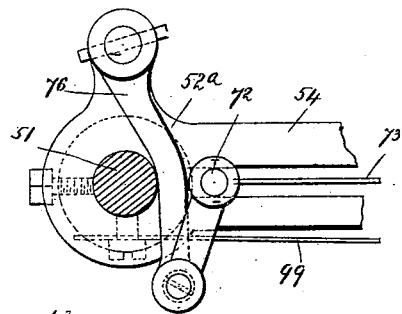
Figure 18:
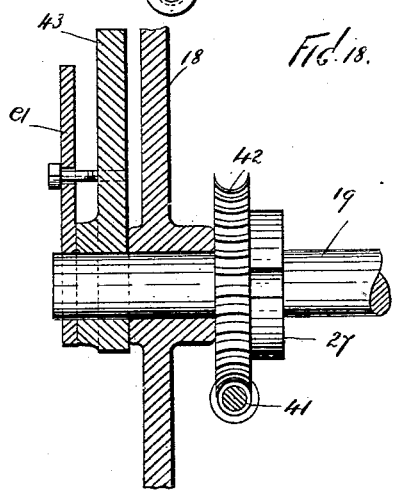
Figure 19:
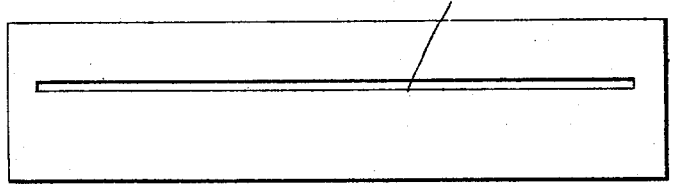

Figure 1 is a side view of the machine, showing one of the interior parts in dotted lines; Fig. 2, a top view of the same, partly broken away. Fig. 3 is a side view of the dipping-frame, showing the filling device and the discharging-shelf on an enlarged scale. Fig. 4 is a plan view of the same. Figs. 5 and 6 are views of details of the same. Fig. 7 is a front end view of the refrigerator and endless apron. Fig. 8 is a rear end view of the same, showing the power-transmitting pulleys for the same and for the power-shaft of the machine. Fig. 9 is a side view of a detail of the driving-gear. Fig. 10 is an end view thereof. Fig. 11 is a side view of a detail of the driving-gear. Fig. 12 is an edge view thereof. Fig. 13 is a sectional elevation of the chocolate-reservoir and agitator. Fig. 14 is a side elevation of the dipping-frame in position to discharge the coated candies; Fig. 15, an enlarged detail view of the screw 93 and projection 93$^a$ upon the rack 45 and the connected parts; Fig. 16, a side elevation of the dipping-frame in dipped position; Fig. 17, a view of the end of the dipping-frame shaft opposite that shown in Fig. 16, with the connected parts. Fig. 18 is a side view of the cam-bearing end of shaft 19, the cams being partly in section; and Fig. 19, an enlarged plan view of a detail of the refrigerator construction.

Referring to the drawings more in detail and to Fig. 1, 18 is the frame of the machine, composed of wood, metal, or other rigid material, and in the front portion thereof and extending from side to side is journaled a main shaft 19. At the front of the machine is pivoted a treadle 20, as at 21, and a cord or strap 20$^a$, secured thereto, passes over a pulley 22, likewise secured in the front portion of the frame, and extends rearwardly to and around a pulley 23, secured to a side piece of the frame and within the same and terminates in a hook 24, which engages a rod 25, which preferably bears at its outer end a roller 26. Upon the shaft 19 within the frame 18 is keyed a collar 27, upon which the roller 26 is adapted to ride during the rotation of the shaft 19, and said collar 27 is recessed, as at 28, to fit the roller 26. Jointed to the rod 25 in proximity to the hook 24 is another rod 29, which extends rearwardly, and the rods 25 and 29 are supported and guided by cleats or slotted blocks 30 and 31. Bearing against the block 31 and surrounding the rod 29 is a coiled spring 32, which bears and exerts pressure against a stop 33 on the rod 29. The outer end of the rod 29 is pivotally connected to a lever 34, which engages pivotally the clutch 35 and also the rigid arm 36, secured to the frame 18. The clutch 35 is mounted on the driving-shaft 37, extending longitudinally of the frame 18 and suitably journaled therein and bearing at its other end the loose pulley 39, over which runs the main driving-belt H$^4$, as shown in Fig. 8. The shaft 37 bears at its inner end a worm-gear 41, and it is evident that by depressing the treadle 20 the rod 29 will operate the clutch 35 to throw the shaft 37 into gear with the pulley 39. Any friction-clutch or other suitable clutch mechanism may be employed. The shaft 19 bears rigidly a gear-wheel 42, meshing with the worm-gear 41 and mounted intermediately of the collar 27 and the frame 18.

Mounted eccentrically on the shaft 19, exteriorly of the frame, is a cam 43 of oval form, and mounted in the frame 18, forward of and above the shaft 19 and suitably journaled in the frame, is a short shaft 44, which bears on the same side of the frame as the cam 43 a fixed segmental rack 45, and the segmental rack 45 bears a cam 46, which bears at its extremity a roller 47, and the cam 43 bears against the roller 47 and is of such conformation of operative surface as to oscillate in one complete revolution any point on the shaft 44 and the segmental rack 45 through an arc equivalent to that of the segment of the segmental rack 45. The shaft 44 also bears rigidly an arm 48, extending rearwardly and bearing pivotally at its extremity a vertical arm 49, which extends exteriorly of the frame 18 and on the same side thereof as the segmental rack 45, and the arm 49 bears at its lower extremity a weight 50, and the object of the weight 50 is to return the segmental rack 45 to the position from which it is moved by the shaft 19 and the cam 43.

Supported upon the upper portion of the frame 18 is another shaft 51, (best shown in Fig. 4,) which extends transversely of the frame 18 and is journaled in either side thereof. The shaft 51 bears a toothed gear-wheel 52 at one end thereof and exteriorly of the frame 18 on the same side thereof as the segmental rack 45, and the segmental rack 45 bears teeth upon the upper arc-shaped portion 53 thereof, meshing with the teeth of the gear-wheel 52, and the shaft 51 bears the dipping-frame and operates to dip it into the molten chocolate and return it to the apron C', all as hereinafter described.

Referring to Figs. 4 and 6, the shaft 51 bears cylindrical heads $52^a$, keyed at either end, as at 53, and bearing slotted radial arms 54, (best shown in Fig. 3,) as at 55, and the arms 54 bear at their outer ends extensions or supplemental arms 56, which form the side supports of the dipping-frame, which is preferably composed of wire rods and cross-rods 57, bearing wire fingers or prongs 58 and hooked base-pieces of wire 59. (Best seen in Figs. 3 and 6.) The base-pieces 59 are movable vertically and have downwardly-bent rear portions which are hooked about rods 60, slidably mounted in vertical guides 61, secured to frame members 62, extending transversely of the dipping-frame and secured to the frame members 57. The candy cores are placed in the dipping-frame upon the wire base-pieces 59 and between the fingers 58, and when the frame is lowered to discharge the coated candies the base-plate 59 will drop and tend to force the drops upon the endless apron C', and may also be made of any design, so as to imprint a mark or design upon the soft-coated candies. I prefer to use wire in the construction of my dipping-frame for the reason that it insures maximum strength with minimum material, allowing of a thorough percolation of the molten chocolate through the frame and about the drops or candies.

The weight 50, acting through the arm 48, holds the rack 45, and consequently the dipping-frame, in position for filling and jarring the latter, as shown in Fig. 3, the cam 40 being pressed against the uneven surface of the cam 43 by said weight.

With the machines now in use the manual handling of the drops or candy cores is necessary in filling the dipping-frame, and this is objectionable from a sanitary as well as economic standpoint. To obviate this, I provide a filling-frame, (best shown in Fig. 3,) which comprises a frame composed of end rods or bars $60^a$ and side rods or bars $61^a$, and mounted upon tracks $62^a$, extending on either side of the dipping-frame in the position shown in Fig. 4, the bars 60 extending above and below the top of the tracks and forming flanges exterior of the track, obviating lateral movement of the frame. The track 62 is provided with a flat base $62^x$ and is supported by standards 63. The vertically-arranged standards 63 are mounted in the upper members of the frame 18, as shown at 64, and threaded set-screws 65 pass through the frame and bind said standards 63 when the latter are adjusted at the right height.

Journaled in the end bars 60 of the filling-frame are a plurality of parallel shafts 66, mounted transversely of the frame 18 and bearing interoperative gear-wheels 67 at their outer ends, respectively, in same side of the frame 18 as the segmental rack 45, and the gear-wheels 67 are exterior of the filling-frame and are of the same diameter. Fixed to one of the shafts 66 is an angular upwardly-extending arm 68, which bears a pin or projection 69, engaging a hooked portion of a spring 70, secured to one of the frame members 61 and exerting upward pressure against the pin 69, and by depressing said arm 68 the interoperating gears 67 will be made to revolve alternately in opposite directions and the spring 70 will return them through reverse motions of the same extent, raising the arm 68 upon the shafts 66 and rigidly-mounted downwardly-looped hooks 71, preferably of wire, (best shown in Figs. 4 and 7,) and arranged oppositely to form pockets in series composed of two shafts 66 and their respective hooks 71. Into the pockets formed by the hooks 71 are dropped the candy cores, and the filling-frame is moved on the track over the dipping-frame, the angular arm 68 is depressed, and the candies deposited in the pockets formed by the fingers 58 and base-pieces 59. The filling-frame is then moved back to its position, as shown in Fig. 4.

As best shown in Figs. 3 and 4, a cross-arm 72 is mounted in the slots 55 of the radial arms 54 and bears a plurality of rods or bars 73, preferably of wire, which extend at right angles thereto and between guide-rods 74, parallel to the cross-arm 72, and the rods 73 are slidably mounted between said rods 74 and adapted to slide over and close the receptacles of the dipping-frame and act as retaining-rods for the candies therein during the dipping operation.

Referring to Fig. 3, 75 is a lever-arm pivotally secured to a shaft $75^a$, journaled in the upper portion of the cylindrical heads $52^a$ on either end of the shaft 51, the dipping-frame being in the position shown in this figure, and it bears integrally a downwardly-projecting arm 76, approximately at right angles thereto and provided at the point of divergence with a catch 77, and said arm 75 is pivotally connected at its lower end with a short arm 78, which is pivotally connected with the end of the cross-arm 72. A standard 79 is mounted in the frame of the machine in proximity to said segmental rack 45 and preferably extends upwardly and rearwardly, so that the upper end shall project above said shaft $75^a$ and in proximity thereto, and upon the upper end portion of said standard is pivotally mounted a catch 80, which has preferably a round body portion 81, over which is passed a curved band-spring 82, secured to the standard 79 at 83. The catch 80 is adapted to engage the catch 77 upon the revolution of the shaft 51.

Pivoted to the cylindrical head $52^a$, as at $84^a$, approximately diametrically opposite to the shaft $75^a$, is a dog 84 of angular shape, the free extremity of which rests normally against the shaft 51 and which is provided, as at 85, (best shown in Fig. 4,) with a notch or recess which the outer end of the arm 75 is adapted to engage upon revolution of the shaft 51, and said dog 84 is provided in its inner angular portion with a pin 86, against which a spring 87, secured to the frame 18, as at 88, is adapted to bear upwardly. Pivoted to the frame 18, beneath the shaft 51, as at 89, is another angular piece 90, which acts as a trip for the dog 84 and has an arm 91 extending upwardly and pressed against the shaft 51 by a spring-strip 92, secured to the standard 79, and the angular strip-piece 90 bears at the apex an adjustable screw 93, which is adapted to come into engagement with a lug or screw $93^a$ on the inner face of the arc-shaped portion of the segmental rack 45, the frame 18 being cut away in the path of said lug $93^a$, as shown, and thus throwing the outer arm of the dog 84 outward from the shaft 51 and releasing the arm 75, which will fly upward, being connected with a spring 94, surrounding the shaft $75^a$, being secured thereto and to the shaft 51, as shown in Fig. 1. The trip-piece 90 is bent outwardly from the cylindrical head $52^a$, allowing the dog 84 to pass under it in the revolution of the shaft 51.

As considerable of the chocolate or other liquid coating material in which the dipping-frame is immersed will cling to the frame and catch in the receptacles thereof, I provide a mechanism for jarring the frame after its emergence from the liquid, comprising a spring-mounted rod (shown at 95 in Figs. 2, 3, and 4) extending transversely of the machine and beneath the rearward transverse member 57 of the dipping-frame. At the sides of and within the frame 18 are extensions 96 of the rod 95 at right angles thereto and forwardly extending. Intermediately of said extensions 96 on the rod 95 are mounted blocks 97, keyed or pinned thereto and having slotted or grooved inner end portions in which, as at 98, are secured the ends of stiff band-springs 99. The band-springs 99 are rigidly secured to the shaft 51 at their inner ends by means of a clamp, as shown in dotted lines at 100 in Fig. 4. The projections 96 of the rod 95 therefore project forwardly, and forward of their outer ends is mounted a shaft $a$, (best shown in Fig. 2,) extending transversely of the frame 18 and suitably journaled therein and bearing toothed wheels $a^2$ opposite the ends of the extensions 96 of the rod 95, and the wheels $a^2$ have teeth $a^3$ adapted to engage said extension ends, the bearing or engaging surfaces of which, as well as of the teeth $a^3$, are preferably curved or beveled to facilitate the release of said extension ends after the engagement of each tooth $a^3$. (Best shown in Fig. 3.)

On the end of the shaft 19 opposite to that which bears the cam 43 and exterior of the frame 18 is loosely mounted a toothed wheel $a^4$. (Best seen in Fig. 2 and shown in dotted lines in Fig. 1.) The toothed wheel $a^4$ is geared in connection with a toothed wheel $a^5$, secured to the end of the shaft $a$ exteriorly of the frame and on the same side of the machine as the wheel $a^4$. The wheels $a^4$ and $a^5$ are geared together by a sprocket-chain $a^6$ engaging the teeth thereof. The wheel $a^4$ has a flat hub $A^4$, (best shown in Fig. 9,) to one side of which are secured dogs $a^7 a^8$ of angular shape and pivoted centrally, as at $a^9$ $b'$, so that their end portions come into contact with the shaft 19, and the inner edges adjacent to the shaft 19 are curved in arcs greater than the peripheral curve of the shaft 19, through which on the same side of the hub $A^4$ or that to which the dogs $a^7 a^8$ are pivoted passes a key or pin $b^2$, and springs $b^3$, secured to the hub $A^4$, exert pressure on the end of each of the dogs $a^7 a^8$, which ends in the revolution of the shaft in the direction indicated by the arrow in Fig. 9 would be successively presented to the pin or key $b^2$, an end of which projects from the shaft 19 over the face of the hub $A^4$.

Secured to the frame 18, adjacent to the wheel $A^4$, is a lug $b^4$, bored and threaded to receive a threaded adjusting-screw $b^5$, which is adapted to bear on the dogs $a^7 a^8$ on the end portion $b^6$ which do not engage the pin $b^2$, and the function of the screw $b^5$ is to successively release the dogs $a^7 a^8$ from the pin $b^2$ in the revolution of the wheel $a^4$, which thus is in the direction of the shaft 19 and, as will be seen, occurs intermittently, imparting motion to the shaft $a$ and vibrating the rod 95. The adjusting-screw $b^5$ may evidently vary the duration of the impulses imparted by the shaft 19 to the wheel $a^4$, and the intermittent movement of the wheel $a^4$ is regulated to furnish power for vibrating the jarring-rod 95 only when the dipping-frame is in certain position, as hereinafter described.

Mounted interiorly of the frame 18 in the forward portion and beneath the dipping-frame is the chocolate-reservoir $b^7$, (shown in dotted lines in Figs. 1 and 3,) having a curved bottom portion and surrounded by a tank $b^8$, (shown in dotted lines in the same figures,) and the tank $b^8$ is adapted to be filled with hot water to keep the chocolate in the reservoir $b^7$ in a liquid condition. A faucet $b^9$ in the forward end and at the bottom of the tank $b^8$ serves as an outlet for the water therein, and both the reservoir and tank may be filled from the top. When the dipping-frame is filled with candy cores, it is dipped in the reservoir $b^7$ by the revolution of the shaft 51, as described. The counter-revolution of the shaft 51 by the return movement of the segmental rack 45 swings the dipping-frame over to inverted position on the endless belt or apron $C'$, which moves the coated chocolates deposited thereon through a refrigerator hereinafter described.

The molten chocolate in the chocolate-reservoir will gradually thicken at the bottom of said reservoir and become too thin throughout the reservoir. To advoid this, an agitator (best seen in Fig. 13) is provided mounted on a shaft B, extending transversely of said reservoir and journaled in the sides thereof, as at $B'$. This agitator bears radial blades $B^2$, having perforations $B^3$, the whole adapted to keep the liquid chocolate thoroughly agitated and mixed. The shaft B bears fixedly at the end nearest the side of the frame 18 at which the sprocket-wheel $a^4$ is located a sprocket-wheel $B^4$, and in the same side of the frame 18 and above the sprocket-wheel $B^4$ is journaled a short shaft $B^5$, which bears at either end fixed sprocket-wheels $B^6$ and $B^7$, respectively within and without the frame 18, and the sprocket-wheels $B^6$ and $B^4$ are suitably geared together by a sprocket-chain $B^8$. Upon the end of the shaft 19, exteriorly of the frame and of the sprocket-wheel $a^4$, is a fixed sprocket-wheel $B^9$, and the sprocket-wheels $B^9$ and $B^7$ are suitably geared together by a sprocket-chain. (Not shown.)

The endless belt $C'$ is supported by a series of rollers about which it passes, and which is as follows: A roller $C^2$ is journaled in the frame 18 at either side thereof, extending transversely across the same and in a vertical plane longitudinally of the frame 18, which is forward of the dipping-frame when the same is inverted to discharge the coated candies. Another roller $C^3$ is at the rear end of the frame 18 and mounted similarly and parallelly to the roller $C^2$. Another roller $C^4$ is mounted between the rollers $C^2$ and $C^3$ and parallel thereto by means of end supports $C^5$, which engage the ends thereof and are hooked loosely about the roller $C^2$ near the ends thereof, and the roller $C^4$ has the function of a tension-roller hanging on the lower portion of the belt C, which extends in an unbroken oval endless curve about the said rollers $C^2$ and $C^3$. The roller $C^3$ bears fixedly at its end exteriorly of the frame 18 and on the same side thereof as the segmental rack 45 a ratchet-wheel $C^6$, and interiorly of the ratchet-wheel $C^6$ is pivotally mounted to the roller $C^3$ a pawl-arm $C^7$, extending therefrom and bearing at one end a pivoted pawl $C^8$ and a coil-spring $C^9$, the other end of which spring is secured to the frame 18. At the other end of the arm $C^7$ is mounted a pivoted pawl $D'$, and the pawls $C^8$ and $D'$ respectively engage the teeth of the ratchet-wheel $C^6$, and the end of the arm $C^7$, which supports the pawl $D'$, is pivotally connected to the rod or arm $D^2$, as at $D^3$, and the rod $D^2$ extends forwardly of the frame 18 and exteriorly thereof and pivotally engages a connecting-link $D^4$, and a lever-arm $D^6$, pivoted intermediate of its ends, as at $D^7$, to the frame 18 and bears at its lower extremity a roller $D^8$, and the other end thereof passes through the link-rod $D^4$, which is longitudinally adjustable thereon and provided with a binding-screw $D^9$. The lever $D^6$ may be adjusted in the connecting-link $D^4$ and when adjusted secured in position by the binding-screw $D^9$ of any desired construction, and the object of the adjusting of the connecting-link $D^4$ is to allow of altering the throw of the rod $D^2$.

Loosely mounted upon the shaft 19, exteriorly of the cam 43, and shown best in Fig. 1, is a cam $e'$, having a projection or arm $e^2$, and the cam $e'$ is adjustably secured to the cam 43 by an adjusting-screw $e^3$, and the projection $e^2$ is hook-shaped and engages at the proper moment in the revolution of the shaft 19 with the roller $D^8$ on the lever-arm $D^6$ and throws the rod $D^2$, moving the ratchet-wheel $C^6$ and the apron $C'$, and the spring $C^9$ and the pawl-arm $C^7$ return the rod $C^2$ and pawl $D'$.

The refrigerator is mounted upon the rear portion of the frame 18 and above the belt or apron $C'$, and shown differently in Figs. 1, 2, 3, 4, 7, and 8, and comprises a casing $e^6$, preferably of wood, and is provided at its forward end with a vertically-adjustable wall $e^7$, (best shown in Fig. 7,) sliding at its side portions behind flanges or cleats $e^8$ on the sides of the refrigerator and having gear-plates $e^9$ in proximity to said cleats, and a shaft or rod extends across the front of the refrigerator and is journaled at said cleats and bears gear-wheels $F'$, operating with said gear-plates, and an operating-wheel $F^2$ at one end, whereby said vertically-adjustable wall $e^7$ may be raised or lowered. The wall $e^7$ bears at its lower edge portion a hinge $F^3$, by which is supported a flap-door $F^4$, which may be lowered down upon the apron $C'$ by the adjustable wall $e^7$ and is adapted to move inwardly of the refrigerator and bears adjustable contact-plates $F^5$ on its vertical edge portions, and binding-screws $F^6$, screwed into said flap-door $F^4$, pass through slots $F^7$ in said contact-plates and bind it in any adjusted position best adapted to receive the outer end of the frame member 56 of the dipping-frame upon the lower ends $F^8$ thereof and to swing said flap-door inwardly over the apron $C'$ and allow of the deposit of the coated chocolate drops on said apron. $F^9$ are springs secured to said wall $e^7$ and passing over the upper ends of the contact-plates $F^5$, which project above the hinge $F^3$ and tend to keep the flap-door $F^4$ closed.

The rear end wall of the refrigerator, as shown in Fig. 8, has an opening at the bottom over the apron $C'$, and above said opening is a flap-door G, hinged to the refrigerator by a hinge or rod $G'$. The flap-door G carries a projecting and forwardly-curved arm $G^2$, having a slot $G^3$, through which passes an adjusting-screw $G^4$, fitted to the refrigerator end, and by the adjusting-screw $G^4$ the flap-door G may be opened at the predetermined angle necessary to allow of the exit of the coated drop from the refrigerator.

A support $G^5$ is fixed to the rear end of the refrigerator and extends therethrough and is bored longitudinally to receive a shaft $g^5$, to the inner end of which is fixed a fan $G^6$ and to the outer end a pulley $g^6$.

Within the refrigerator are ice-chests $G^7$, preferably two, as shown in dotted lines in Fig. 8 and partially in Fig. 1 in full lines, supported by hooks $G^8$, secured to the ends thereof and fitting rods $G^9$, extending across the refrigerator near the top thereof. The ice-boxes $G^7$ are of greater vertical cross-section at the middle portions than at the ends, and the inner sides thereof are separated, as at $g^8$, and of much less vertical extension throughout than the outer sides $G^7$ at their lines of greatest vertical extension. All the sides and faces of the ice-boxes $G^7$ are preferably plane and straight. By the construction described the ice-boxes $G^7$ have a lowest portion at the middle of the outer sides thereof, and said lowest portions are fitted with waste-pipes H, communicating with the interior thereof and adapted to carry away the water. Below the ice-chests is a drain-compartment $H'$, extending across the refrigerator and secured in any suitable way to the sides thereof and having an open space between either end thereof and the ends of the refrigerator. The compartment $H'$ is of diminished vertical section at its middle portion and has openings in its upper surface with which the pipes H communicate and waste-pipes $H^2$ at the side to discharge the water received from the ice-boxes $G^7$ at the sides of the apron $C'$, and the sides and faces of the compartment $H'$ are all preferably plane and straight. A lid $H^3$ fits the open roof or upper side of the refrigerator and may be removed to place ice in said ice-chests.

The sides of the refrigerator are closed and the bottom open, as described. The fan $G^6$ is adapted to revolve and agitate the air in the refrigerator and keep it circulating below the under surfaces of the ice-chests and about the compartment $H'$ in a vertical circular motion, keeping the coated drops on the apron $C'$ constantly subjected to a cool draft of air.

The machine is preferably furnished power by means of a main belting $H^4$, (shown in Fig. 8,) which turns the pulley 39 in the direction denoted by the arrow shown in Fig. 8, and said belt returns from the pulley 39 about the guide-pulley $H^5$, mounted in the frame 18 at the opposite side thereof. A pulley $H^6$ is mounted above the pulley $H^5$, and fixed on a short shaft journaled in the frame 18, which bears another pulley $H^7$, and the belt $H^4$ engages the pulley $H^6$ as it passes to the pulley 39 and turns the pulley $H^7$. A double pulley $H^8$ is mounted on the rear end of the refrigerator-casing, and over it runs a belt $H^9$, which is run by the pulley $H^7$, and the double pulley $H^8$ supports upon its larger circumference $H^{10}$ a belt $H^{11}$, which engages and runs the pulley $g^6$, turning the fan $G^6$.

A pan K is supported at the front of the machine by a frame $K'$, having a hooked rear member passing over a rod $K^2$, supported by the frame 18 and under lugs or strips $K^3$. The pan K holds the candy cores or bodies to be placed in the filling-frame. A pan L is supported at the rear end of the machine by a support $L'$, secured to the frame 18, and a scraper or guide-plate $L^2$ is pivoted to the frame 18 under the flap-door $G^2$ and is pressed against the belt $C'$ by a spring $L^3$, secured to the frame 18, and the outer lower end of the guide-plate $L^2$ is suspended over the pan L and is adapted to lift the finished candies from the belt $C'$ and guide them into the pan L. The scraper $L^2$ also acts as a scraper and scrapes the waste chocolate from the belt $C'$ and deposits it through a slot $L^4$ into a cup $L^5$.

The operation of this machine will be readily understood from the foregoing description, when taken in connection with the accompanying drawings and the following statement thereof.

The candy cores are taken from the pan K and placed in the pockets formed by the hooks 71 of the filling-frame, and the filling-frame is moved along the track 62 until over the dipping-frame, which latter will be in the position shown in Fig. 3. The lever-arm 68 is then depressed, and the cores will fall into the pockets formed by the finger 58 and base-pieces 59 of the filling-frame. The dipping-frame is then ready to be dipped into the chocolate-reservoir $b^7$, and the machine is started by depressing the treadle 20, which draws down the cord $20^a$, operating the rod 29, and lever 34, operating the clutch 35 and coupling the shaft 37 with the pulley 39 and which is run by the belt $H^4$. Simultaneously the roller 26 is withdrawn from the recess 28 in the collar 27, and the shaft 19 is unlocked, and the worm-gear 41 immediately begins to turn said shaft in the direction indicated by the arrow in Fig. 1.

Due to the shape of the cam 43, as shown in Fig. 1, the roller 47 at the outer extremity of the cam 46 is borne downwardly in contact with said cam 43 by the weight 50, connected with the arm 48, and the segmental rack 45 revolves the gear-wheel 52, which it engages, and also the dipping-frame shaft 51, depressing the filled dipping-frame toward the chocolate-reservoir $b^7$. Referring to Figs. 3 and 4, as the dipping-frame moves downward the lever-arm 75, pivotally mounted on the shaft $75^a$ by means of the catches 77 and 80, is depressed and engages with the notch or recess 85 in the dog 84 and is locked thereby, the arms 76 and 78 being thrown forward, moving the cross-arm 72 forward and the retaining-rod 73 over the pockets or receptacles in the dipping-frame to retain the candy cores in position during the dipping movement. When the dipping-frame has reached the limit of its downward movement, the shape of the cam 43 (seen in Fig. 1) causes the cam 46 to reverse its movement, and it and the weight 50 are raised and the shaft 51 reversed in its movement and the dipping-frame moved in a wide ascending arc and brought over in its descent onto the apron C' at its forward upper portion, and at this time the lug or screw $93^a$ on the segmental rack 45 (shown in Fig. 1) strikes against the adjustable screw 93 on the trip 90, (shown in Fig. 3,) and during the rearward movement of the dipping-frame the lever 75 and dog 84 have ridden under the bent trip-piece 91, and said trip-piece now engages the outer end of the dog 84 and forces it against the spring 87, releasing the lever-arm 75, which is thrown upward by the spring 94 in the shaft 51, withdrawing the cross-arm 72 and the retaining-rods 73 and allowing the coated chocolates to fall out upon the belt or apron C', as seen in Figs. 3 and 7. This operation is assisted by the slidably-mounted rods 60, which are connected with the base-pieces 59 and which fall upon or press the drops, forcing them out should they stick and imprinting a symbol or mark upon them, if desired. The jarring-rod 95 is so controlled in its operation by the toothed wheels $a^2$ and the loosely-mounted toothed wheel $a^4$ (seen in Fig. 9) and operating in connection therewith that the extensions 96 of said jarring-rod shall not be vibrated by the toothed wheel $a^2$ when jarring-rod and extensions, due to the movement of the dipping-frame, would be driven against the dipping-frame and broken. This latter might otherwise occur just after the dipping-frame left its position, as shown in Fig. 3, to be dipped and just before renewing said position after being dipped. The jarring-rod is therefore vibrated when the dipping-frame rests in a horizontal position, as shown in Fig. 3, and just after it has emerged from the chocolate-reservoir. The agitator (shown in Fig. 13) mounted in the chocolate-receptacle is in continuous operation during the motion of the shaft 19 through its connection therewith by the sprocket-wheels $b^7$ and $b^9$ and sprocket-chain $b^{10}$ and sprocket-wheels $b^4$ and $b^6$ and sprocket-chain $b^8$. When the dipping-frame has reached the belt or apron C', the extension members 56 thereof press against the ends $f^8$ of the contact-plates $F^5$, as shown in Fig. 7, and open inwardly the flap-door $F^4$ of the refrigerator, the vertically-movable wall $e^7$ being at the proper height, and the coated drops are placed upon the belt or apron C', and the dipping-frame returns to the position shown in Fig. 3, the shaft 51 being reversed in movement by the conformation of the cam 43 and the connecting parts, as previously described. When the dipping-frame returns from the apron C', the flap-door $F^4$ automatically closes by the spring $F^9$. Just previous to the locking of the shaft 19 by the roller 26 in the recess 28 of the collar 27 (shown in Fig. 1) the arms $e^2$ of the cam $e'$ engage the roller $D^8$ of the lever $D^6$ and force the rod $D^2$ forwardly, the roller $D^8$ riding over the outer curve of the extension $e^2$ of the cam $e'$ to operate the pawl-arm $C^7$ and the pawl $C^8$ and turn the ratchet-wheel $C^6$, the roller moving the belt so as to draw the coated candy drops into the refrigerator. When the machine is again started, the lever-arm $D^6$ will be sprung back into the position shown in Fig. 1 by the spring $C^9$, attached to the pawl-arm $C^7$. The fan runs continuously during the movement of the belt $H^4$, which is operated by any suitable engine or other means, the power being transmitted thereto by the belts $H^9$ and $H^{11}$ and pulleys $H^6$, $H^7$, $H^8$, $H^{10}$, and $g^6$, the directions of motion of said pulleys being indicated by arrows in Fig. 8. When the roller 26 rides into the recess 28 in the collar 27, being pressed therein by the spring 32, the clutch mechanism is operated to withdraw the clutch and disconnect the shaft 37 and the pulleys 39, stopping the revolution of the worm-gear 41, the machine being at rest with its parts in the position shown in Fig. 1. When the belt C' is full of coated drops, those which have advanced farthest toward the rear end of the refrigerator are sufficiently cooled and hardened and pass under the flap-door G, which is sufficiently opened, and the guide-plate $L^2$ guides them into the pan L.

Having fully described my invention, I claim as new and desire to secure by Letters Patent—

1. A machine for dipping chocolates and analogous confections, comprising a main frame, a chocolate-reservoir mounted therein, a main shaft, a tubular frame pivotally mounted above said reservoir and in operative connection with said main shaft and adapted to hold said confections and dip them into said chocolate-reservoir, a filling-frame slidably mounted in proximity to said dipping-frame and adapted to hold said confections and to be moved over said dipping-frame to deposit said confections into said dipping-frame, a power-supply device, a power-shaft in operative connection with said main shaft and provided with a clutch mechanism, and means for operating said clutch mechanism to operatively connect said power-supply device and said power-shaft, and devices connected with said main shaft and with said clutch mechanism and adapted to operate said clutch mechanism to disconnect said power-shaft and said power-supply device, substantially as shown and described.

2. In a machine for dipping chocolates and analogous confections, a chocolate-reservoir, a pivotally-mounted dipping-frame adapted to hold said confections and dip them into said chocolate-reservoir, a main shaft operatively connected with said dipping-frame and adapted to swing said dipping-frame, and a weight operatively connected with and adapted to return said dipping-frame, substantially as shown and described.

3. In a machine for dipping chocolates and analogous confections, a chocolate-reservoir, a dipping-frame having receptacles for holding the confections, a filling-frame adapted to be moved above said dipping-frame and comprising cross-arms journaled in said frame, fingers or hooks mounted in said cross-arms forming pockets or holders for the confections, and means for revolving said cross-arms to release the confections, into the receptacle of the dipping-frame, substantially as shown and described.

4. In a machine for dipping chocolates and analogous confections, a chocolate-reservoir, a dipping-frame for holding the confections and dipping them into said reservoir, a filling-frame longitudinally and vertically adjustable and mounted upon tracks extending above and at the side of said dipping-frame, substantially as shown and described.

5. In a machine for dipping chocolates and analogous confections, a chocolate-reservoir, a dipping-frame for holding the confections and dipping them into said reservoir, and a filling-frame movably mounted on tracks extending above and at the sides of said dipping-frame, said tracks being vertically adjustable, substantially as shown and described.

6. In a machine for dipping chocolate drops and analogous confections, a chocolate-reservoir, a dipping-frame mounted in proximity thereto and adapted to be dipped into said reservoir, a jarring device adapted to jar said dipping-frame to remove the surplus chocolate adhering thereto and means connected therewith to automatically start and stop said jarring device and comprising a shaft, a wheel loosely mounted thereon, a pin passing through said shaft and extending from the periphery thereof, spring-pressed catches on said wheel adapted to engage said pin, and an adjustable screw mounted in proximity thereto and adapted to move said catches out of engagement with said pin, substantially as shown and described.

7. In a machine for dipping chocolate drops and analogous confections, an endless apron, a refrigerator mounted thereover and provided with a vertically-adjustable front portion, a flap-door pivotally connected to the bottom thereof, and a rear flap-door provided with devices for holding it open at the required angle, substantially as shown and described.

8. In a machine for dipping chocolate drops and analogous confections, an endless movable apron, a refrigerator mounted thereover and provided with a vertically-adjustable front portion, a flap-door pivotally connected to the bottom thereof and having vertically-adjustable contact-plates, a spring for closing said flap-door and a rear flap-door provided with devices for holding it open at the required angle, substantially as shown and described.

9. In a machine for dipping chocolate drops and analogous confections, a main shaft, a power-shaft geared in operative connection therewith, a pulley loosely mounted on said power-shaft, a clutch mechanism adapted to connect said power-shaft, and said pulley, a recessed collar on said main shaft and a rod connected with said clutch mechanism and locking said main shaft in said recessed collar, and normally held in said recess by a spring and means for operating said clutch mechanism to connect said pulley and power-shaft and unlock said main shaft, substantially as shown and described.

10. In a machine for dipping chocolate drops and analogous confections, a main shaft, a refrigerator for cooling and hardening the dipped drops, an endless belt moving therethrough and supported by rollers, a ratchet-wheel mounted on the end of one of said rollers, a pawl connected with a spring-retracted pivoted arm mounted on the same roller and adapted to engage said ratchet-wheel and a connecting-rod connected to said pivoted arm and engaging at an end with a lever-arm, and a cam mounted on said main shaft and adapted to engage said lever-arm to operate said connecting-rod and said pivoted arm, pawl and ratchet and move said belt forwardly, substantially as shown and described.

11. In a machine for dipping chocolate drops and analogous confections, an endless belt for receiving the dipped drops and supported by rollers, a ratchet-wheel mounted on one end of one of said rollers, a pawl connected with a spring-retracted pivoted arm mounted on the same roller and adapted to engage said ratchet-wheel, a connecting-rod connected to said pivoted arm and engaging adjustably at an end with a lever-arm, a cam mounted on the main shaft of the machine and having a radially-adjustable arm adapted to engage said lever-arm to operate said connecting-rod and said pivoted arm, pawl and ratchet, and move said belt forwardly, substantially as shown and described.

12. In a machine for dipping chocolate drops and analogous confections, a chocolate-reservoir, a dipping-frame pivotally mounted on a shaft above said reservoir and having pockets for holding the drops during the dipping movement thereof, a cross-rod mounted in said frame and provided with retaining-rods adapted to slide over and close said pockets, a head mounted on said shaft, a lever-arm pivotally mounted on said head and pivotally engaging said cross-rod, an arm or finger pivotally mounted on said head and rigidly connected with said lever-arm, a spring-pressed dog pivotally mounted on said head and which said arm or finger is adapted to engage, a spring-pressed trip-piece pivotally mounted on said head, devices for engaging said finger and forcing said lever-arm outwardly and forcing said finger into engagement with said dog, and means for operating said trip-piece to release said finger and return said lever-arm, withdrawing said retaining-rods from their position closing said pockets, substantially as shown and described.

13. In a machine for dipping chocolate drops and analogous confections, a main frame, a chocolate-reservoir mounted therein, a dipping-frame pivotally mounted above said reservoir and adapted to hold said confections and dip them into said chocolate-reservoir, a filling-frame slidably mounted in proximity to said dipping-frame and adapted to receive said confections and to be moved over said dipping-frame and deposit said confections therein, a main shaft in operative connection with said dipping-frame, a power-shaft in operative connection with said main shaft and provided with a clutch mechanism, a power-supply device, means for operating said clutch mechanism to operatively connect said power-supply device and said power-shaft, devices connected with said main shaft and with said clutch mechanism and adapted to operate said clutch mechanism to disconnect said power-supply device and said power-shaft, an endless movable apron mounted in said frame and adapted to receive the dipped confections, an open-bottomed refrigerator mounted above said apron, ice-tanks, deflector-surfaces and a revoluble fan in said refrigerator, said fan being in operative connection with said power-shaft, an agitator in said reservoir also in operative connection with said power-shaft, and means for actuating said power-supply device, substantially as shown and described.

14. A machine for dipping chocolate drops and analogous confections, comprising a main frame, a power-shaft journaled therein, a chocolate-reservoir, an agitator mounted in said reservoir and in operative connection with said power-shaft, a dipping-frame pivotally mounted above said reservoir and in operative connection with said power-shaft and adapted to hold said confections and dip them into said reservoir, jarring devices in operative connection with said power-shaft and adapted to intermittently jar said dipping-frame, a filling-frame mounted in proximity to said dipping-frame and adapted to receive said confections and to be moved over said dipping-frame and deposit said confections therein, an endless movable belt mounted in said main frame in operative connection with said power-shaft and adapted to receive said confections when cooled, an open-bottomed refrigerator mounted above said endless belt, ice-chests, deflector-plates and a revoluble fan mounted in said refrigerator, said fan being in operative connection with said power-shaft, and means for actuating said power-shaft, substantially as shown and described.

15. In a machine for dipping chocolate drops and analogous confections, an endless apron, a refrigerator mounted thereover and provided with a vertically-adjustable front portion, a flap-door pivotally connected to the bottom of said vertically-adjustable front portion and provided with vertically-adjustable contact-plates, and with inwardly-curved lower end portions, substantially as shown and described.

16. In a machine for dipping chocolates and analogous confections, a filling-frame comprising side and end members, revoluble cross-arms journaled in said members, fingers or hooks connected with said cross-arms and forming pockets or holders for the confections and means for revolving said cross-arms to release the confections into the receptacles of a dipping-frame, substantially as shown and described.

In testimony that I claim the foregoing as my invention I have signed my name, in presence of the subscribing witnesses, this 31st day of October, 1898.

PANAYIOTIS PANOULIAS.

Witnesses:
F. A. STEWART,
A. C. McLOUGHLIN.